(12) United States Patent
Faulkner et al.

(10) Patent No.: US 6,971,637 B1
(45) Date of Patent: Dec. 6, 2005

(54) POWER-OPERATED VEHICLE LIFTING SYSTEM

(75) Inventors: Thaddeus Faulkner, 153 Hawthorne Ave., Yonkers, NY (US) 10701; Dwight Faulkner, Yonkers, NY (US)

(73) Assignee: Thaddeus Faulkner, Yonkers, NY (US)

( * ) Notice: Subject to any disclaimer, the term of this patent is extended or adjusted under 35 U.S.C. 154(b) by 27 days.

(21) Appl. No.: 10/773,633

(22) Filed: Feb. 9, 2004

(51) Int. Cl.$^7$ ................................................. B60S 9/02
(52) U.S. Cl. ...................................................... 254/423
(58) Field of Search .................................. 254/418–427

(56) References Cited

U.S. PATENT DOCUMENTS

| | | | |
|---|---|---|---|
| 3,362,683 A | * | 1/1968 | Hansen ........................ 254/423 |
| 3,870,276 A | | 3/1975 | Phillips |
| 3,997,143 A | | 12/1976 | Rose |
| 4,067,543 A | | 1/1978 | Orth et al. |
| 4,103,869 A | | 8/1978 | Mesny et al. |
| D384,474 S | | 9/1997 | White |
| 5,992,826 A | | 11/1999 | Simmonds |

\* cited by examiner

*Primary Examiner*—Robert C. Watson (57) ABSTRACT

A power-operated vehicle-lifting system includes a first housing secured to a select portion of a vehicle frame and a first lifting mechanism disposed within the first housing. Such a lifting mechanism is electrically coupled to a power source and includes a reversible motor, and a hydraulic jack operably connected to thereto. The lifting mechanism is pivotal between operating and non-operating positions wherein the jack can be extended and retracted for lifting a vehicle off a ground surface. The present invention may include a second lifting mechanism for cooperating with the first lifting mechanism so that a vehicle may be lifting in a preferred direction.

13 Claims, 7 Drawing Sheets

POWER-OPERATED VEHICLE LIFTING SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a vehicle lifting system and, more particularly, to a telescopically-operated vehicle lifting system for selectively raising a vehicle in a vertical direction.

2. Prior Art

Jack systems for raising and leveling vehicles, such as trailers, campers and the like have come into use for a variety of reasons. With the advent of the truck camper, the jack systems are used to support the camper when it is not attached to the truck bed and are also frequently used to stabilize the camper from tilting and swaying, as well as to level them even when attached to the truck bed. With trailers, various means have been used in the past to stabilize them, such as placing bricks under the corners and later utilizing jacks to firmly support the trailer in a stabilized and level position.

Trailers were at one time leveled by jacking up one or more corners and placing bricks, boards or other objects under the wheels or the trailer itself. Subsequently systems were designed which were automatically operated either electrically or hydraulically to raise one or more corners of the trailer to level and stabilize it. Among these systems are built-in vertical jacks used to stabilize the trailer and including an automatic switching system, which automatically operates diagonal jacks until the trailer was level and stable.

Another system used a scissors-type jack attached to each corner or thereabout on trailers and has a pendulum-operated switching system to operate one or more jacks in an electro-hydraulic fashion. The problem with these two systems is the need for either complex electrical and hydraulic systems or the installation of the jacks on the frame before building or attaching the trailer.

Heretofore, there have been a variety of electrical, hydraulic, and mechanical operated jacks used for leveling vehicles, trailers, or the like. Generally, the most common jacks are jacks mounted on the corners of a vehicle, or on the tongue of a trailer, which raise and lower the vehicle and trailer is a vertical direction. These jacks have no provision for retracting the jack from a vertical position to a stowed horizontal position underneath the vehicle.

Also a common problem of a vehicle jack may have a sufficient initial torque to raise the vehicle to a level position, but after an extended period of time, the jack assembly locks up and the operator is unable to lower the vehicle. This problem is particularly true when added weight is loaded on to the vehicle or a shift in position takes place subsequent to the leveling of the vehicle. An excess torque is therefore is therefore necessary to lower the vehicle.

Accordingly, a need remains for a power-operated vehicle lifting system to over come the above-noted shortcomings.

BRIEF SUMMARY OF THE INVENTION

In view of the foregoing background, it is therefore an object of the present invention to provide a power-operated system for vehicle lifting. These and other objects, features, and advantages of the invention are provided by a power-operated vehicle-lifting system including a first housing and a plurality of fastening members for securing same to a select portion of a vehicle frame.

The first housing has an open bottom portion including a cover pivotally connected thereto and movable between open and closed positions respectively, a locking mechanism for maintaining the cover at a closed position, and a first lifting mechanism disposed within the first housing and electrically coupled to a power source. The locking mechanism preferably includes a latch member that has a lower end portion connected to the cover, and a quick-release pin removably engageable with the latch member for advantageously maintaining same at a locked position.

A first stop member may be connected to the first housing and extends downwardly therefrom towards the jack. A second stop member may be connected to the stationary section and extends radially outwardly therefrom. The first and second stop members are engageable when the jack is rotated to a predetermined vertical position for advantageously preventing the jack from pivoting therebeyond.

The first lifting mechanism includes a reversible motor, and a hydraulic jack operably connected to the motor. Such a hydraulic jack is pivotally connected to the first housing via a bolt so that the jack can be moved between operating and non-operating positions respectively. The motor may further include a switch cover pivotally connected to the first housing and a control switch disposed within the switch cover. The control switch is preferably movable between up and down positions for toggling the jack between retracted and extended positions respectively.

The hydraulic jack further includes a stationary section and a plurality of movable sections preferably slidably engageable with the stationary section and movable between retracted and extended positions. The hydraulic jack may also include a sump and a flexible conduit that has opposed end portions connected, to the sump and the jack respectively. The sump may be operably controlled by the motor for selectively transferring fluid to the jack during operating conditions.

The hydraulic jack may further include a helical spring member that has opposed end portions connected to the stationary section and the first housing for assisting to pivot the jack from an operating position to a non-operating position. A support member preferably having an arcuate end portion is removably engageable with a select one of the plurality of movable sections so that same can be maintained at a substantially horizontal position. The support member may include a U-bolt and a wing nut threadably engageable therewith for advantageously securing the support member to the housing.

In an alternate embodiment, the vehicle-lifting system may further include a second housing connected to a select portion of a vehicle and spaced from the first housing. Such a second lifting mechanism is disposed within the second housing and cooperates with the first lifting mechanism so that a vehicle may be elevated and lowered as desired by a user.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1–7 by the reference numeral 10 and is intended to provide a power-operated vehicle lifting system. It should be understood that the system 10 may be used to lift many different types of vehicles.

Figure 1:
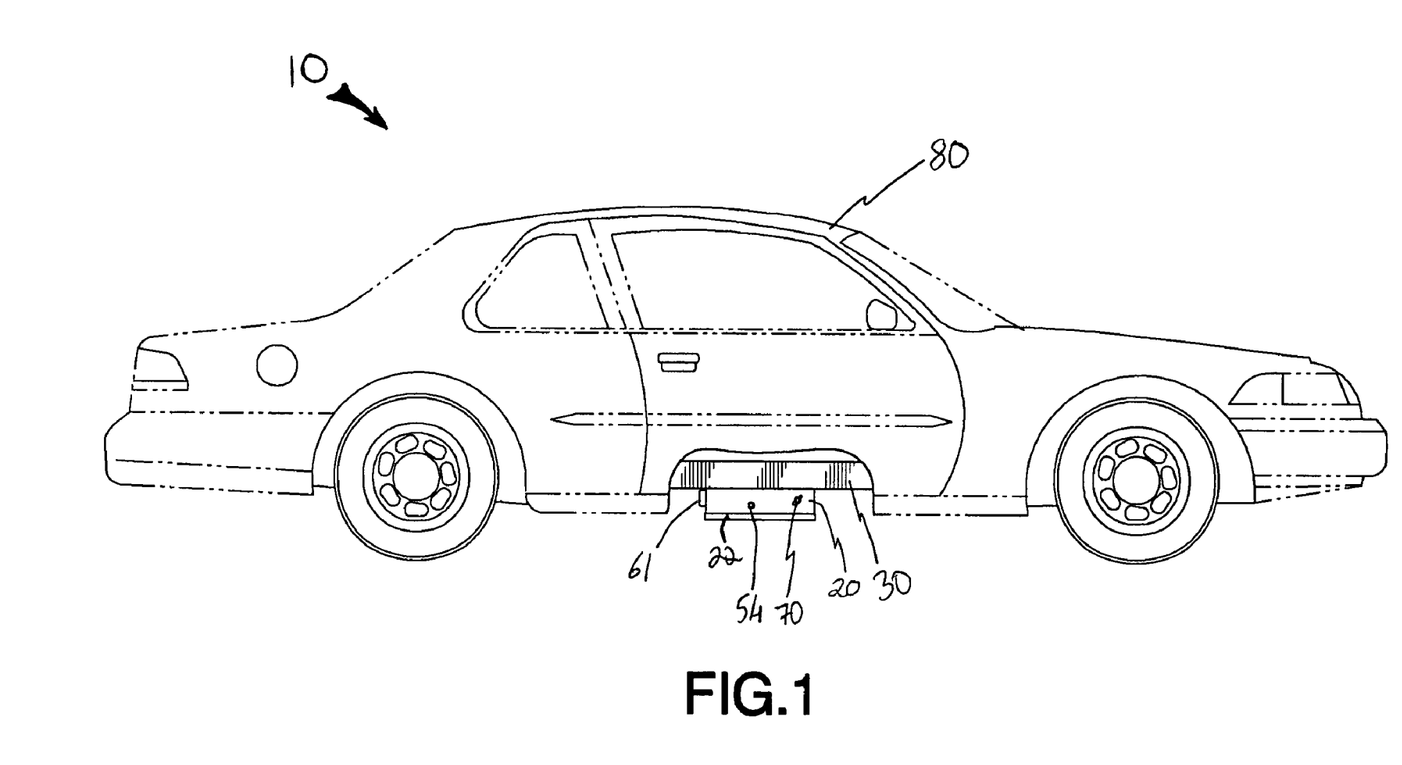
FIG. 1 is a side elevational view showing a power-operated vehicle lifting system connected to an automobile, in accordance with the present invention.
Figure 2:
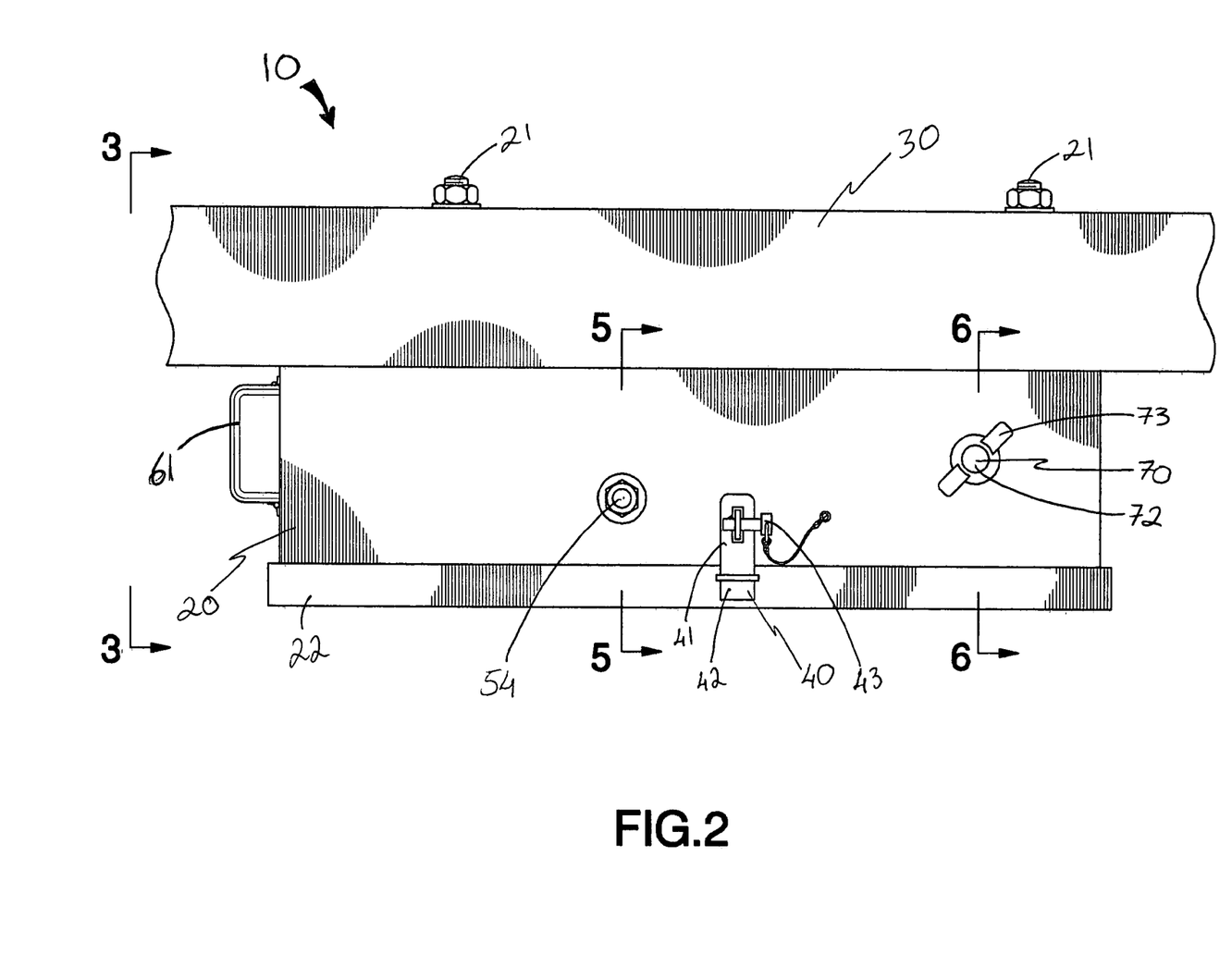
FIG. 2 is an enlarged side elevational view of the system shown in FIG. 1.
Figure 3:
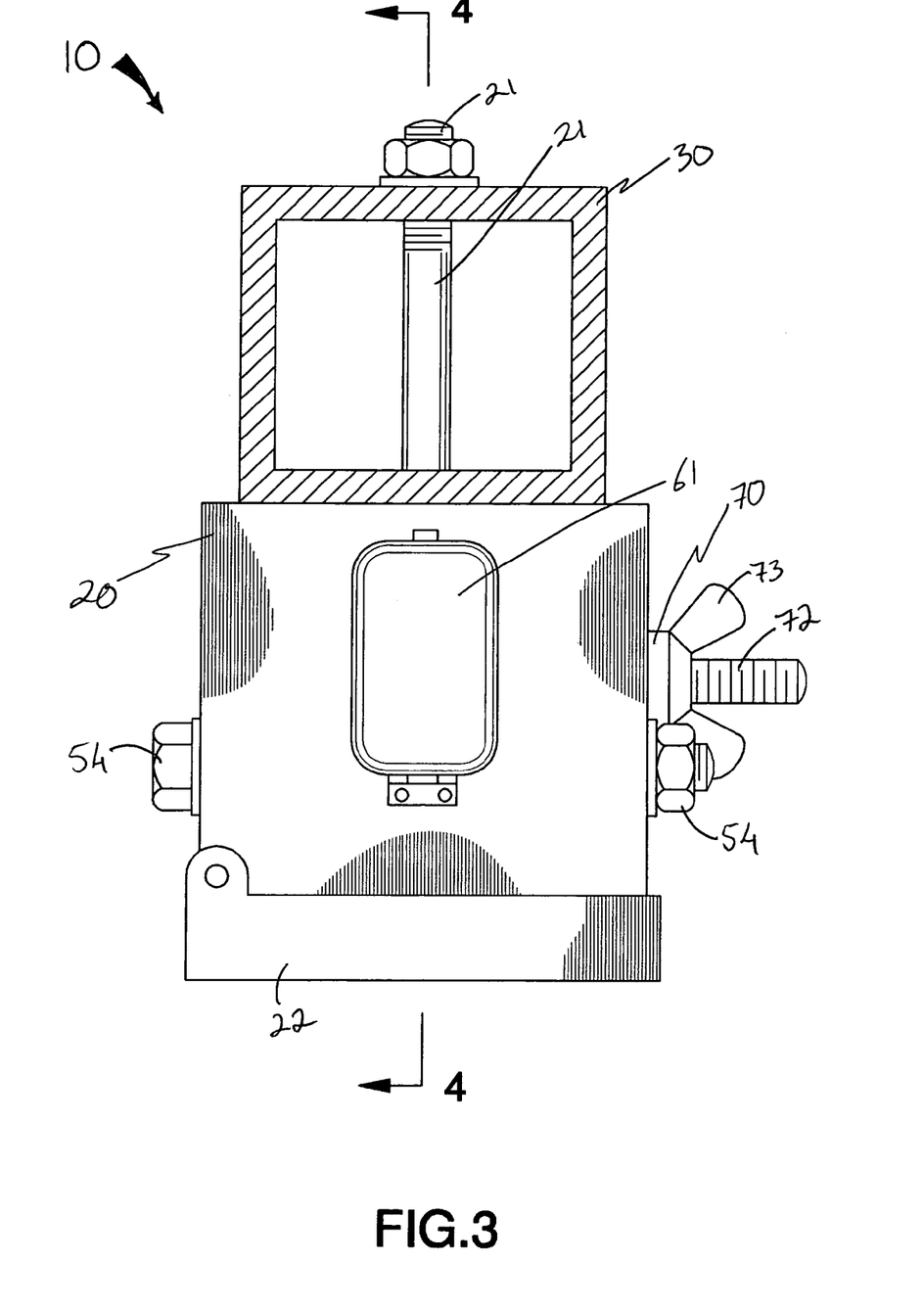
FIG. 3 is an enlarged rear elevational view of the system shown in FIG. 2.
Figure 4:
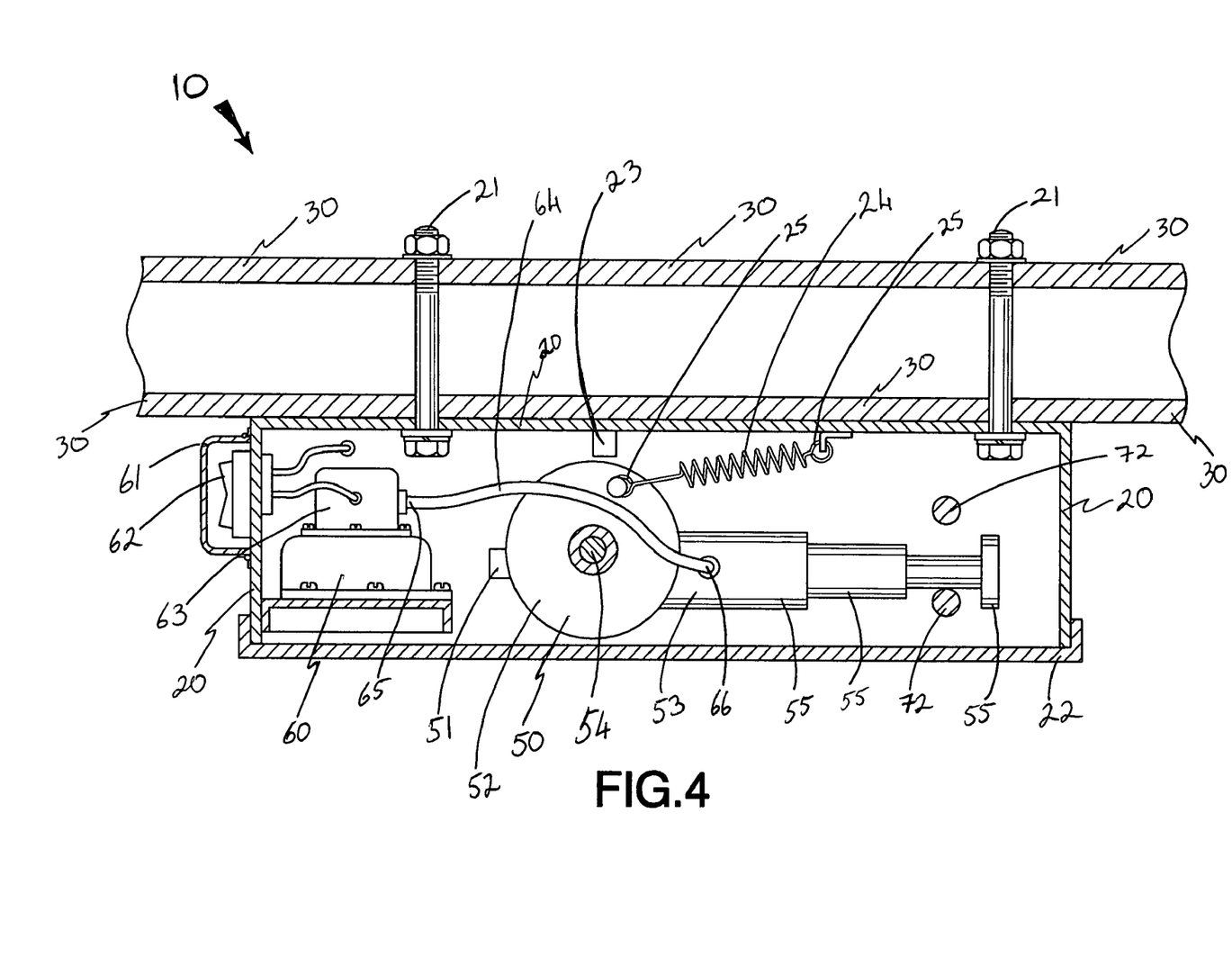
FIG. 4 is a cross-sectional view of the system shown in FIG. 3, taken along line 3—3.
Figure 5:
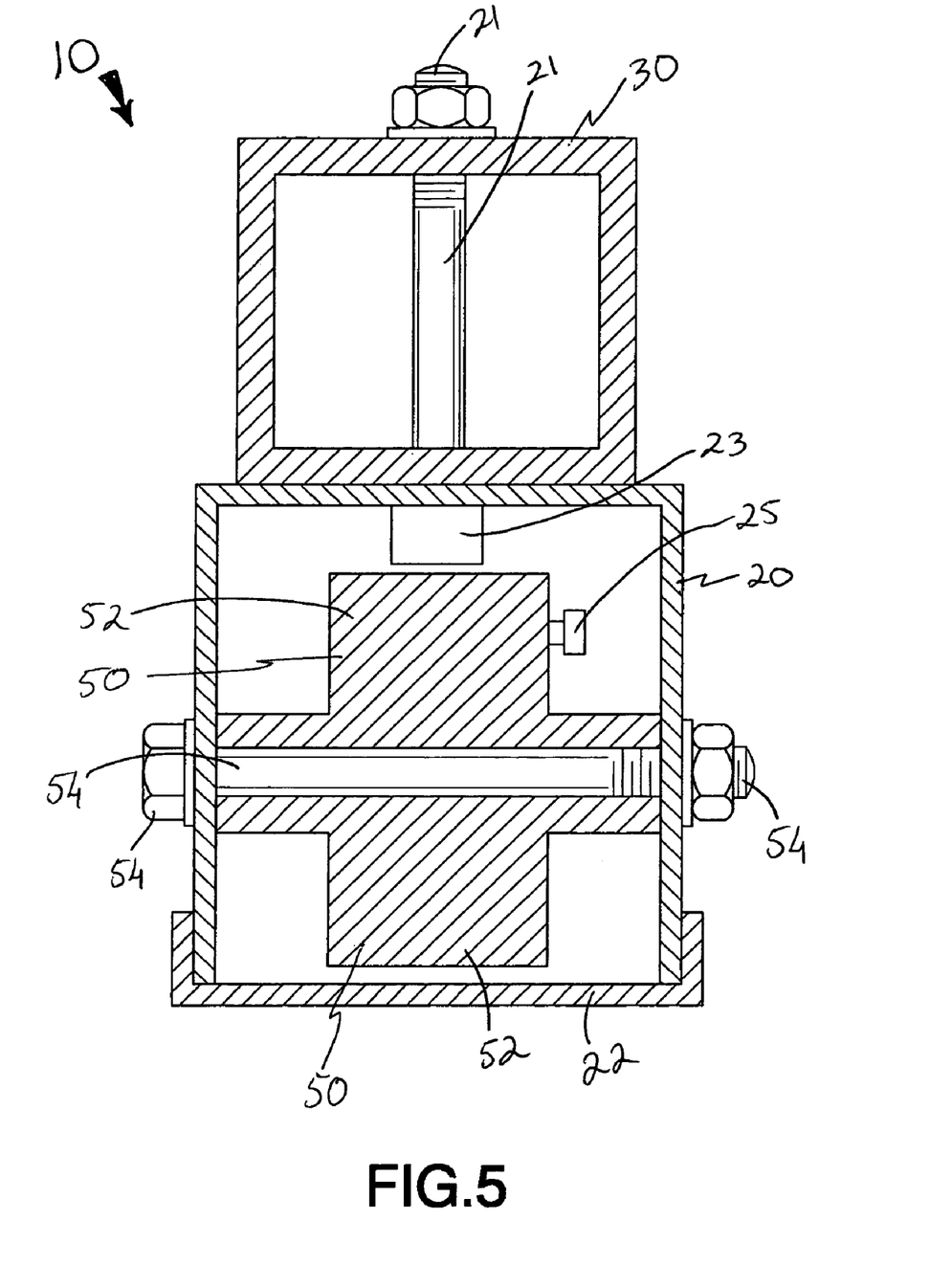
FIG. 5 is a cross-sectional view of the system shown in FIG. 2, taken along line 5—5.
Figure 6:
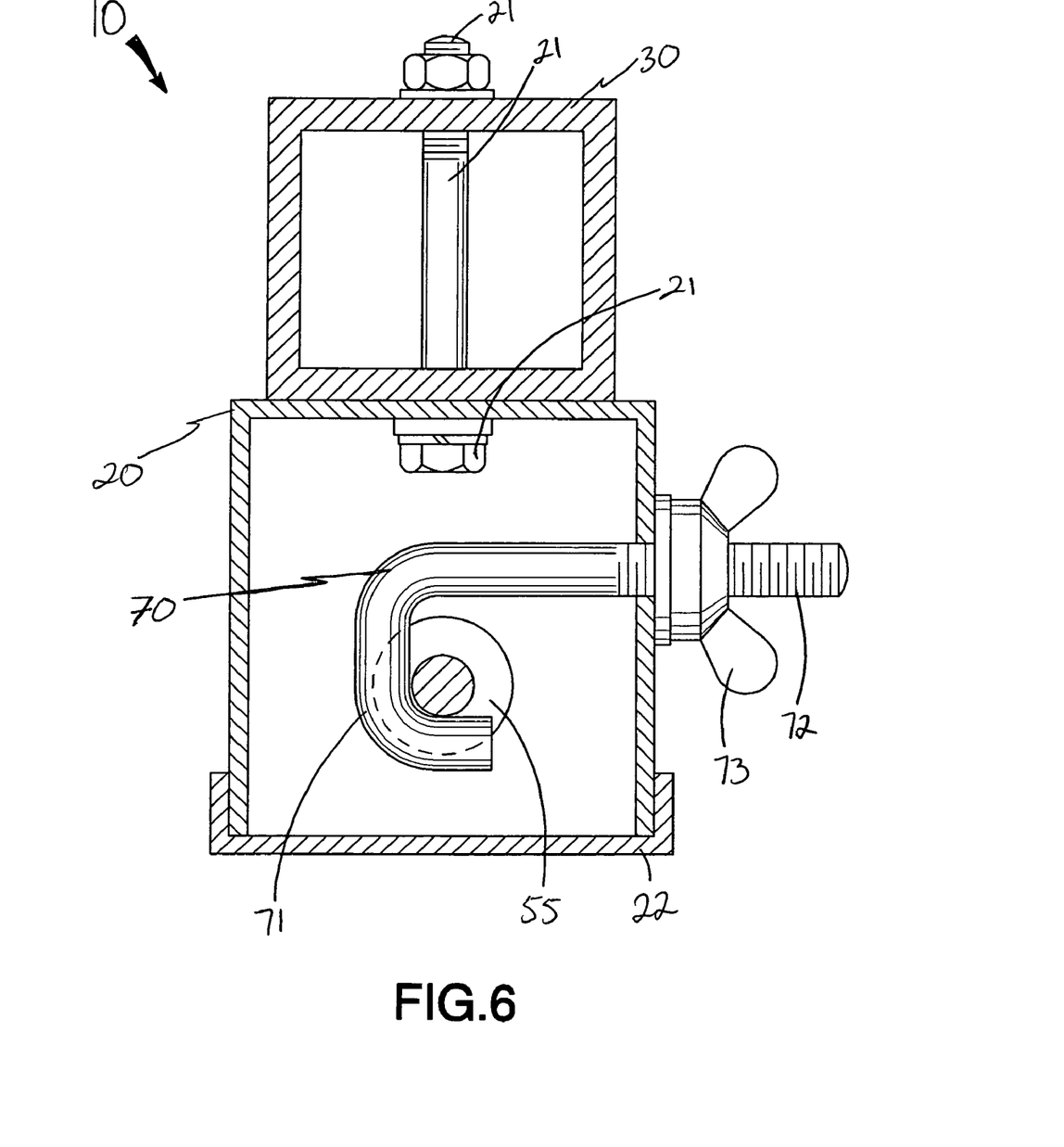
FIG. 6 is a cross-sectional view of the system shown in FIG. 2, taken along line 6—6.
Figure 7:
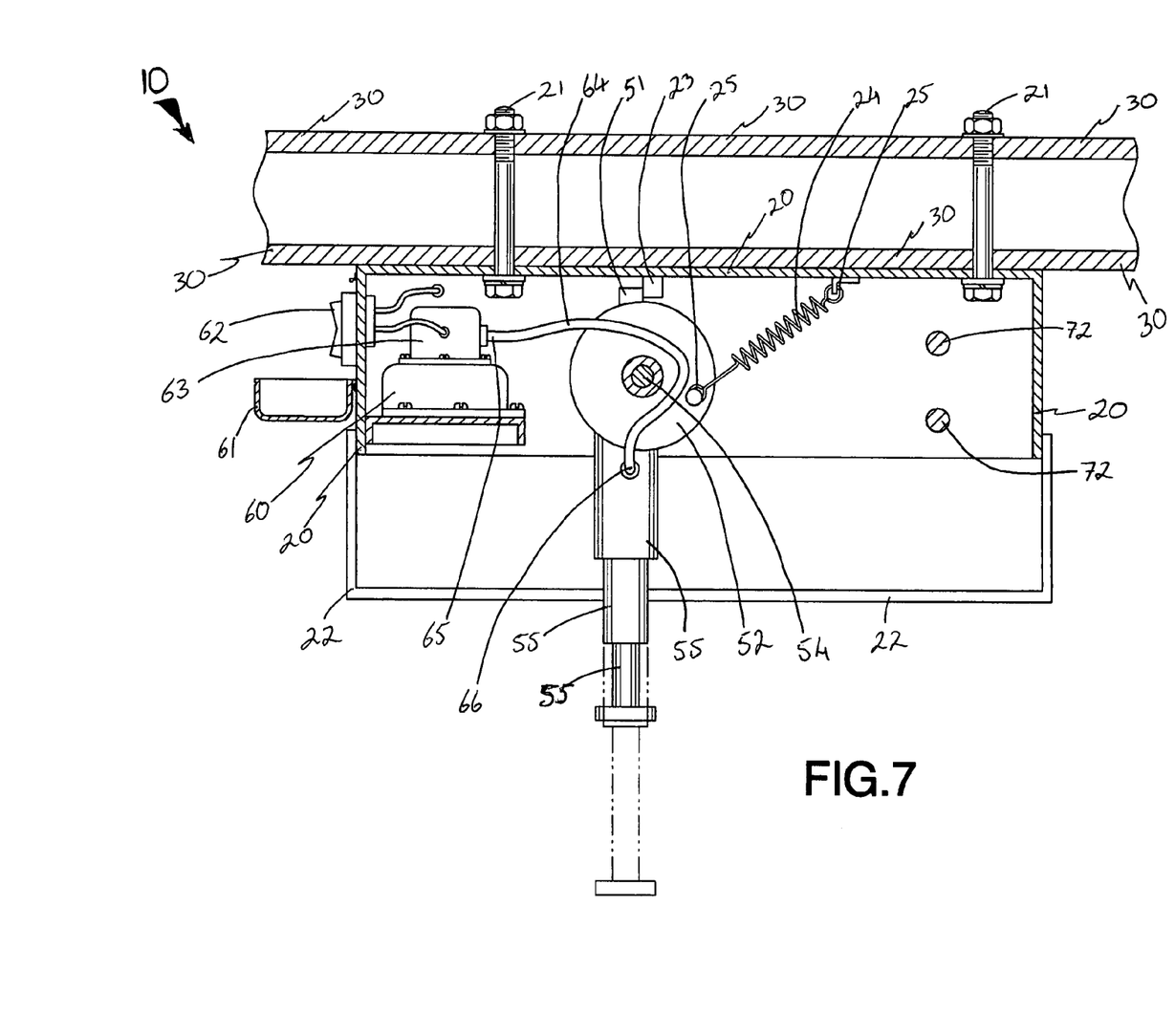
FIG. 7 is a cross-sectional view of the system shown in FIG. 1, showing the lifting mechanism at a non-operating position.

Referring initially to FIG. 1, the system 10 includes a first housing 20 and a plurality of fastening members 21 for securing same to a select portion of a vehicle 80 frame 30 out of any line of sight, thus not altering the appearance of ones vehicle.

The first housing 20 has an open bottom portion including a cover 22 pivotally connected thereto and movable between open and closed positions respectively, a locking mechanism 40 for maintaining the cover 22 at a closed position, and a first lifting mechanism 50 disposed within the first housing 20 and electrically coupled to a power source (not shown). The locking mechanism 40 includes a latch member 41 that has a lower end portion 42 connected to the cover 22, and a quick-release pin 43 removably engageable with the latch member 41 for advantageously maintaining same at a locked position.

A first stop member 23 is connected to the first housing 20 and extends downwardly therefrom towards the jack 53. A second stop member 51 is connected to the stationary section 52 and extends radially outwardly therefrom. The first 23 and second stop 51 members are engageable when the jack 53 is rotated to a predetermined vertical position for advantageously preventing the jack 53 from pivoting therebeyond.

The first lifting mechanism 50 includes a reversible motor 60, and a hydraulic jack 53 operably connected to the motor 60. Such a hydraulic jack 53 is pivotally connected to the first housing 20 via a bolt 54 so that the jack 53 can be moved between operating and non-operating positions respectively. The electrically operated hydraulic jack 53 eliminates the need for a conventional mechanical jack that is space consuming and difficult to operate. The system 10 also permits do-it-yourself tasks, such as tire-rotations and oil changes to be performed with ease at home.

The motor 60 further includes a switch cover 61 pivotally connected to the first housing 20 and a control switch 62 disposed within the switch cover 61. The control switch 62 is movable between up and down positions for toggling the jack 53 between retracted and extended positions respectively. The system 10 operable by the simple flip of a switch 62 will be particularly helpful for the elderly, females, handicapped individuals and motorists other physical problems that might prevent their operating a mechanical jack.

The hydraulic jack 53 further includes a stationary section 52 and a plurality of movable sections 55 slidably engageable with the stationary section 52 and movable between retracted and extended positions. The hydraulic jack 53 also includes a sump 63 and a flexible conduit 64 that has opposed end portions 65, 66 connected to the sump 63 and the jack 53 respectively. The sump 63 is operably controlled by the motor 60 for selectively transferring fluid (not shown) to the jack 53 during operating conditions.

The hydraulic jack 53 further includes a helical spring member 24 that has opposed end portions 25 connected to the stationary section 52 and the first housing 20 for assisting to pivot the jack 53 from an operating position to a non-operating position. A support member 70 having an arcuate end portion 71 is removably engageable with a select one of the plurality of movable sections 55 so that same can be maintained at a substantially horizontal position. The support member 70 includes a U-bolt 72 and a wing nut 73 threadably engageable therewith for advantageously securing the support member 70 to the housing 20.

In an alternate embodiment, the vehicle-lifting system 10 further includes a second housing (identical to the first housing) connected to a select portion of a vehicle 80 frame 30 and spaced from the first housing 20. A second lifting mechanism (identical to the first lifting mechanism) is disposed within the second housing and cooperates with the first lifting 50 mechanism so that a vehicle 80 may be elevated and lowered as desired by a user.

The appealing features of the vehicle-lifting system 10 are its safety, ease of use, and convenience. Instead of struggling along the roadside in the rain or snow with a standard mechanical jack, this system 10 will lift a car in seconds for a tire replacement. Since the system 10 is permanently installed it ensures that the hydraulic jack 53 is always available.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A power-operated vehicle-lifting system comprising:
    a first housing and a plurality of fastening members for securing same to a select portion of a vehicle frame, said first housing having an open bottom portion and comprising
    a cover pivotally connected thereto and movable between open and closed positions respectively,
    a locking mechanism for maintaining said cover at a closed position; and
    a first lifting mechanism disposed with said first housing and being electrically coupled to a power source, said first lifting mechanism comprising
    a reversible motor, and
    a hydraulic jack operably connected to said motor and being pivotally connected to said first housing via a bolt so that said jack can be moved between operating and non-operating positions respectively.

2. The vehicle-lifting system of claim 1, wherein said hydraulic jack comprises:
    a rotating section and a plurality of movable sections slidably engageable with said rotating section and movable between retracted and extended positions;
    a sump and a flexible conduit having opposed end portions connected to said sump and said jack respectively, said sump being operably controlled by said motor and for selectively transferring fluid to said jack during operating conditions;
    a helical spring member having opposed end portions connected to said rotating section and said first housing for assisting to pivot said jack from an operating position to a non-operating position; and
    a support member having an arcuate end portion removably engageable with a select one of said plurality of movable sections so that same can be maintained at a substantially horizontal position.

3. The vehicle-lifting system of claim 2, further comprising:
    a first stop member connected to said first housing and extending downwardly therefrom towards said jack; and
    a second stop member connected to said rotating section and extending radially outwardly therefrom, said first and second stop members being engageable when said jack is rotated to a predetermined vertical position and for preventing said jack from pivoting therebeyond.

4. The vehicle-lifting system of claim 1, wherein said motor further comprises:
    a switch cover pivotally connected to said first housing; and
    a control switch disposed within said switch cover, said control switch being movable between up and down positions for toggling said jack between retracted and extended positions respectively.

5. The vehicle-lifting system of claim 1, wherein said locking mechanism comprises:
    a latch member having a lower end portion connected to said cover; and
    a quick-release pin removably engageable with said latch member and for maintaining same at a locked position.

6. The vehicle-lifting system of claim 2, wherein said support member comprises:
    a U-bolt and a wing nut threadably engageable therewith for securing said support member to said housing.

7. The vehicle-lifting system of claim 1, further comprising:
    a second housing connected to a select portion of a vehicle and being spaced from said first housing; and
    a second lifting mechanism disposed within said second housing and cooperating with said first lifting mechanism so that a vehicle may be elevated and lowered as desired by a user.

8. A power-operated vehicle-lifting system comprising:
    a first housing and a plurality of fastening members for securing same to a select portion of a vehicle frame, said first housing having an open bottom portion and comprising
    a cover pivotally connected thereto and movable between open and closed positions respectively,
    a locking mechanism for maintaining said cover at a closed position; and
    a first lifting mechanism disposed with said first housing and being electrically coupled to a power source, said first lifting mechanism comprising
    a reversible motor, and
    a hydraulic jack operably connected to said motor and being pivotally connected to said first housing via a bolt so that said jack can be moved between operating and non-operating positions respectively, said jack comprising
    a rotating section and a plurality of movable sections slidably engageable with said rotating section and movable between retracted and extended positions,
    a sump and a flexible conduit having opposed end portions connected to said sump and said jack respectively, said sump being operably controlled by said motor and for selectively transferring fluid to said jack during operating conditions,
    a helical spring member having opposed end portions connected to said rotating section and said first housing for assisting to pivot said jack from an operating position to a non-operating position, and
    a support member having an arcuate end portion removably engageable with a select one of said plurality of movable sections so that same can be maintained at a substantially horizontal position.

9. The vehicle-lifting system of claim 8, further comprising:
    a first stop member connected to said first housing and extending downwardly therefrom towards said jack; and
    a second stop member connected to said rotating section and extending radially outwardly therefrom, said first and second stop members being engageable when said jack is rotated to a predetermined vertical position and for preventing said jack from pivoting therebeyond.

10. The vehicle-lifting system of claim 8, wherein said motor further comprises:
    a switch cover pivotally connected to said first housing; and
    a control switch disposed within said switch cover, said control switch being movable between up and down positions for toggling said jack between retracted and extended positions respectively.

11. The vehicle-lifting system of claim 8, wherein said locking mechanism comprises:
- a latch member having a lower end portion connected to said cover; and
- a quick-release pin removably engageable with said latch member and for maintaining same at a locked position.

12. The vehicle-lifting system of claim 8, wherein said support member comprises:
- a U-bolt and a wing nut threadably engageable therewith for securing said support member to said housing.

13. The vehicle-lifting system of claim 8, further comprising:
- a second housing connected to a select portion of a vehicle and being spaced from said first housing; and
- a second lifting mechanism disposed within said second housing and cooperating with said first lifting mechanism so that a vehicle may be elevated and lowered as desired by a user.

* * * * *